H. W. COLLENDER.
Billiard-Table Cushion.
No. 167,501. Patented Sept. 7, 1875.
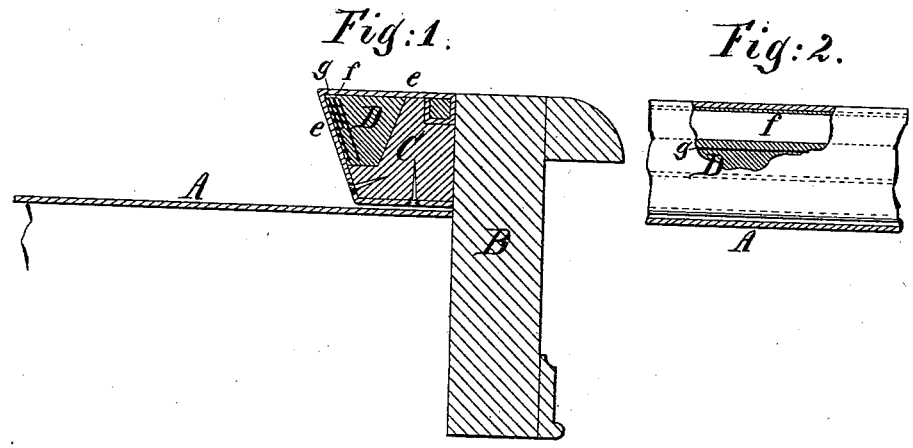
Witnesses:
Jacob Felbel
D. B. Wilmot
Inventor:
Hugh W. Collender
By his attorney
J. V. McIntire

UNITED STATES PATENT OFFICE.

HUGH W. COLLENDER, OF NEW YORK, N. Y.

IMPROVEMENT IN BILLIARD-TABLE CUSHIONS.

Specification forming part of Letters Patent No. 167,501, dated September 7, 1875; application filed July 29, 1875.

*To all whom it may concern:*

Be it known that I, HUGH W. COLLENDER, of New York city, in the county of New York, in the State of New York, have invented new Improvements in Billiard-Table Cushions; and I do hereby declare that the following is a full and exact description thereof, reference being had to the accompanying drawings, and to the letters of reference marked thereon.

My invention relates to an improvement in that kind of billiard-table cushions for which Letters Patent of the United States were granted to me on the 26th day of November, 1867; and consists in the combination, with the layers of rubber and the thin strips of other material near the face of the cushion, of a strip of metal located intermediate of the layers or strata of hardening material, and securely united to the rubber composing the cushion.

To enable those skilled in the art to make and use my invention, I will proceed to more fully describe it, referring by letters to the accompanying drawings, in which—

Figure 1 is a sectional view of a billiard-table cushion and cushion-rail, and showing a portion of the bed of the table. Fig. 2 is a partial face view or elevation of the cushion, and Fig. 3 is a detail sectional view of the cushion-strip of exaggerated size for purposes of clearer illustration.

In the several figures the same parts will be found designated by the same letter of reference.

A represents the bed of a billiard-table, and B the cushion-rail, to the inner portion C of which latter is attached the elastic cushion D, which, as usual, is covered by a cloth, $e$, or covering fastened on in the ordinary way.

The structure or formation and character of the cushion D are different from those of any cushion (or cushion-strip) heretofore made in these particulars, viz: that a strip of thin metal, $f$, is employed in combination with the layers of rubber and the layers or strips of cloth or other material incorporated to harden the cushion-face and prevent the spreading upward of the rubber.

The cushion D is formed, as fully described in my prior patent hereinbefore referred to, of alternate layers of soft vulcanized rubber and thin strips of cloth or other pliable substance which will not readily stretch, previously coated with india-rubber, and the whole united while the rubber is in a green or plastic state, and then vulcanized together; but between two of the layers of cloth is inserted or placed a strip of metal, $f$, as seen in the drawings. This metal strip, like the thin layers of cloth, is combined with the rubber while the latter is in a green or plastic state, and the whole is then vulcanized (or subjected to the vulcanizing process) together. In this manner the cushion as an entirety is produced with all its component parts in perfect union. The presence of the strip of metal lends additional rigidity to the cushion, and increases its capacity to throw off the ball, or, technically speaking, makes the cushion "faster."

As it is not desirable to have the cushion too fast nor too impressible on the face, nor, on the other hand, too sluggish or too hard on the face, it is most desirable to attain to the proper medium between these extremes in the structure or formation of a billiard-table cushion. It is also of vital importance to have the separate pieces or parts composing a cushion so perfectly and inseparably united that the cushion shall be capable of maintaining its perfection for the longest possible time, and under the severest usage. These desirable qualifications are, I believe, all united in an eminent degree in my improved cushion.

The combination of the metal strip $f$ with the layers of soft vulcanized rubber and strip or sheets of canvas or other pliable material which will not readily stretch, produces a cushion-strip which, while it will be sufficiently "fast," will take the "English" readily, will not permit the balls to jump, will give correct angles, and will be exceedingly durable.

The strip $f$ is, by preference, made about one-quarter of an inch wide, and is arranged about parallel with the face of the cushion, and so that its upper edge is just covered properly by the rubber. This strip $f$ I propose to have made of thin sheet or spring steel. It should be of the proper thickness and character to withstand the concussion to which it has to be subjected without having its straightness (in the direction of its length) impaired.

Having so fully explained my improved cushion or cushion-strip for billiard-tables that those skilled in the art can make and use the same, I do not claim, broadly, as of my invention the employment in a cushion-strip of rubber, of a metal strip and a layer or strip of fibrous material; but What I do claim is—

A billiard-table cushion or cushion-strip composed of india-rubber, with two or more layers of canvas, or other material that will not stretch readily, incorporated therein, and having a metal strip arranged in the rubber and intermediate to two of the said layers of canvas, the whole constructed and arranged to operate in the manner described.

In testimony whereof I have hereunto set my hand and seal this 27th day of July, 1875.

H. W. COLLENDER. [L. S.]

In presence of—
 J. N. McIntire,
 Jacob Felbel.